United States Patent [19]

Higashioka et al.

[11] Patent Number: 5,326,581
[45] Date of Patent: Jul. 5, 1994

[54] CHOCOLATES

[75] Inventors: Hiroshi Higashioka; Yukitaka Tanaka, both of Ibaraki, Japan

[73] Assignee: Kao Corporation, Tokyo, Japan

[21] Appl. No.: 765,975

[22] Filed: Sep. 26, 1991

[30] Foreign Application Priority Data

Sep. 26, 1990 [JP] Japan .................. 2-258299

[51] Int. Cl.$^5$ .............................................. A23G 3/00
[52] U.S. Cl. ........................................ 426/607; 426/660
[58] Field of Search ...................... 426/607, 631, 660

[56] References Cited

U.S. PATENT DOCUMENTS

| | | | |
|---|---|---|---|
| 4,228,190 | 10/1980 | Wallgren | 426/603 |
| 4,276,322 | 6/1981 | Padley | 426/607 |
| 4,284,655 | 8/1981 | Miller | 426/602 |
| 4,524,086 | 6/1985 | Player | 426/607 |
| 4,536,411 | 8/1985 | Kirton | 426/603 |
| 4,656,045 | 4/1987 | Bodor | 426/607 |
| 4,873,109 | 10/1989 | Tanaka | 426/607 |
| 5,160,760 | 11/1992 | Takemori | 426/660 |

FOREIGN PATENT DOCUMENTS

| | | |
|---|---|---|
| 0188122 | 7/1986 | European Pat. Off. . |
| 0196210 | 10/1986 | European Pat. Off. . |
| 0378893 | 7/1990 | European Pat. Off. . |
| 0426155 | 5/1991 | European Pat. Off. . |
| 51-86167 | 7/1976 | Japan . |

OTHER PUBLICATIONS

Abstract of JP-63-301743 in English.

Primary Examiner—Carolyn Paden
Attorney, Agent, or Firm—Birch, Stewart Kolasch & Birch

[57] ABSTRACT

Chocolates that comprise a diglyceride having a melting point of 25° C. or less are found to exhibit a soft texture at temperatures below room temperature and stable qualities at temperatures above room temperature. Further, such chocolates display a good ability to melt in one's mouth. Also, the chocolates exhibit an enriched chocolate flavor as well as a crisp after taste.

11 Claims, No Drawings

CHOCOLATES

BACKGROUND OF THE INVENTION

1. Field of the Invention

The present invention relates to chocolates wherein the fat component comprises a diglyceride that has a melting point of 25° C. or less.

2. Description of Related Art

Chocolates are typically comprised of cacao mass and/or cacao powder, cacao fat, and sweeteners. Cacao mass, cacao powder, and cacao fat are produced from cacao beans. The beans are roasted and pulverized in order to obtain cacao mass. The cacao mass is then pressed in order to separate cacao powder and cacao fat; the fat being 100% oil.

However, there have been produced various chocolates containing other fats as a substitute for the cacao fat. By using these other fats, the properties of the chocolate can be modified. Thus a proper product is selected from among these chocolates depending upon its intended use. From the viewpoint of usage, chocolates may be roughly classified into those which are hard at ordinary temperature, i.e. solid chocolates, and those which are soft at ordinary temperature, i.e. enrober chocolates.

There have been proposals to control the appearance and rheological properties of chocolates by blending a liquid oil, such as sesame oil or cotton seed oil (cf. "Chokoreto/Kokoa Seizo no Riron to Jissai", p. 250, Korin Shoin). Japanese Patent Laid-Open No. 86167/1976 discloses producing a soft chocolate by blending plastic fats. Japanese Patent Laid-Open No. 15495/1981 teaches improving the physico-chemical properties by controlling the blending balance of fats similar to cacao. In general, rheological properties appropriate for each chocolate product are achieved by controlling the amount of cacao fat, fats similar thereto, liquid oils, milk fat and/or plastic fats contained in the chocolate.

However no chocolate product has been developed thus far that melts easily in ones mouth, exhibits excellent cacao flavor, maintains a soft texture (softness in the mouth) below room temperature, and exhibits stable qualities (blooming resistance, oil-off resistance, etc.) above room temperature.

SUMMARY OF THE INVENTION

In order to solve the aforesaid problems, the present inventors have conducted extensive studies. As a result, they have discovered that chocolates having a soft texture below room temperature and exhibiting stable qualities above room temperature can be obtained by using cacao fat and/or fat(s) similar thereto together with a diglyceride that has a melting point of 25° C. or less, in the fat component.

Accordingly, the present invention is directed to a chocolate comprising (1) cacao mass, cacao powder, or mixtures thereof; (2) sweetener; and (3) fats; wherein said fats are comprised of (a) 50-8% by weight of cacao fat, a fat similar thereto, or mixtures thereof, and (b) 2-50% by weight of a diglyceride composition which consists of one or more diglycerides and has a melting point of 25° C. or less, based on the total weight of fats, and, optionally, milk fat.

DETAILED DESCRIPTION OF THE INVENTION

As the diglycerides to be used n the present invention, any diglyceride may be selected so long as it has a melting point of 25° C. or less. It is particularly preferable to use diglycerides (glycerol difatty acid esters) having a melting point of from −20° to 15° C. The fatty acid moiety of the diglycerides, preferably include unsaturated fatty acids having from 16 to 22 carbon atoms. The content of these fatty acid residues is preferably at least 70% by weight, more preferably at least 80% by weight, based on the total of the fatty acid residues in the diglycerides. It is particularly preferable to use di-unsaturated diglycerides. Among all, di-cis-unsaturated diglycerides are preferable and the content thereof is preferably at least 50% by weight, more preferably at least 70% by weight, based on the total amount of diglycerides.

The diglyceride having a melting point of 25° C. or less to be used in the present invention may be obtained by transesterifying a mixture comprising one or more natural fats and glycerol in the presence of a hydroxide of an alkali metal and/or an alkaline earth metal. Suitable natural fats include, for example, vegetable oils, such as safflower oil, rapeseed oil, corn oil, soybean oil, cotton seed oil, olive oil or palm oil, animal fats such as lard, beef tallow, fish oil or butter, and those obtained by hardening, fractionating or random-transesterifying any of these fats. Alternatively, a mixture comprising a fatty acid composition having a high level of unsaturated fatty acids and glycerol may be esterified.

The term "cacao fat and/or fat(s) similar thereto" embraces not only cacao fat but also the conventional cacao fat substitutes that have been used in the past to improve the cost and quality of chocolates. Such fats have a melting property that is similar to cacao fat and include fats prepared by fractionation of vegetable oils, fats prepared by fractionation of transesterified fat products, and hydrogenated fat products. For example, a fractionated palm oil, a fractionated shea butter or a mixture of either of these two fractions with illippe butter can be used in the present invention as the 'fats similar to cacao fat'. Additionally, a fractionated fat from tranesterified palm oil, olive oil or safflower oil can be used. Moreover, saturated higher fatty acids, such as stearic acid, are suitable for use as the 'fat similar thereto'.

In the present invention, it is preferable that the content of the cacao fat and/or fat(s) similar thereto range from 50 to 98% by weight while that of the diglyceride range from 2 to 50% by weight, based on the total weight of the fat component. When the content of the diglyceride having a melting point of 25° C. or below is less than 2% by weight, the obtained chocolate is poor in soft texture and stable qualities. Alternatively, when it exceeds 50% by weight the obtained chocolate does not have an excellent cacao flavor.

The sweeteners to be used in the present invention include all conventional edible sweeteners including granulated sugar, sorbitol, and sucrose.

The chocolates of the present invention may be produced by any known method without restriction.

The chocolates of the present invention are suitable for use in to any purpose, including solid chocolates and enrober chocolates.

EXAMPLES

To further illustrate the present invention, and not by way of limitation, the following Examples will be given, wherein all parts are by weight.

Production Example 1: Production of diglycerides

Fatty acids originating from soybean oil, rapeseed oil and rice bran oil were treated in the following manner to thereby give diglycerides (1) to (3).

500 parts of each fatty acid, 80 parts of purified glycerol and 100 parts of a lipase preparation originating form Mucor miehei were mixed together and esterified with stirring at 65° C. under reduced pressure for 8 hours. The obtained product was freed from the acid in a molecular distillation device, thus obtaining 400 to 430 parts of an esterified product.

400 parts of the above product was then subjected to column chromatography by using 2,000 parts of silica gel, thus obtaining 310 to 340 parts of a diglyceride of each of the aforesaid fatty acids. These diglycerides are described in Table 1.

TABLE 1

| Analytical data of diglycerides | | | |
|---|---|---|---|
| Diglyceride | (1) | (2) | (3) |
| Starting fatty acid | soybean oil | rapessed oil | rice bran oil |
| m.p. (°C.) | 12.1 | 8.4 | 28.3 |
| Fatty acid composition (%)[*1]: $C_{16}$ | 9.6 | 5.5 | 21.6 |
| $C_{18}$ | 3.6 | 1.8 | 1.9 |
| $C_{18=1}$ | 36.2 | 59.2 | 39.3 |
| $C_{18=2}$ | 42.7 | 20.7 | 33.8 |
| $C_{18=3}$ | 5.8 | 9.8 | 1.8 |

Note:
[*1]: Fatty acid content of the diglyceride product
$C_{16}$: saturated fatty acid having 16 carbon atoms.
$C_{18}$: saturated fatty acid having 18 carbon atoms.
$C_{18=1}$: unsaturated fatty acid having 18 carbon atoms and one unsaturated bond.
$C_{18=2}$: unsaturated fatty acid having 18 carbon atoms and two unsaturated bonds.
$C_{18=3}$: unsaturated fatty acid having 18 carbon atoms and three unsaturated bonds.

EXAMPLES 1 AND 2 AND COMPARATIVE EXAMPLES 1 TO 3

A chocolate of each formulation listed in Table 2 was produced by a common method. The total fat content of this system was 32% by weight.

TABLE 2

| | Ex. 1 | Ex. 2 | Comp. Ex. 1 | Comp. Ex. 2 | Comp. Ex. 3 |
|---|---|---|---|---|---|
| granulated sugar | 45 | 45 | 45 | 45 | 45 |
| whole fat milk powder | 15 | 15 | 15 | 15 | 15 |
| cacao mass | 25 | 25 | 25 | 25 | 25 |
| cacao fat | 6 | 6 | 15 | 6 | 6 |
| diglyceride (1) | 9(28) | | | | |
| diglyceride (2) | | 9(28) | | | |
| diglyceride (3) | | | | 9(28) | |
| soybean oil | | | | | 9(28) |
| lecithin | 0.3 | 0.3 | 0.3 | 0.3 | 0.3 |

Note:
Each figure given in parenthesis is expressed in % by weight based on the total fat component.

The softness, stability, and flavor of each chocolate thus obtained were evaluated by the following methods. The results are summarized in Table 3.

Evaluation of chocolate

Softness

After the production, each chocolate sample was stored at 20° C. for one month and then the hardness thereof was measured. Hardness was determined with a Leometer as the force necessary to penetrate 3 mm into the chocolate using a triangular aperture having a base of 10 mm and a height of 12 mm.

Stability

Each sample was subjected to a number of treatment cycles until blooming had occurred. One treatment cycle comprised (1) 30° C. for 11 hours, (2) temperature shifting for 1 hour, (3) 18° C. for 11 hours, and (4) temperature shifting for 1 hour. A test expert observes, after the step at 18° C. for 11 hours, whether or not blooming has taken place. The results are shown in Table 3 in terms of the number of cycles applied until blooming had been observed.

Flavor

Each chocolate sample was stored at 20° C. for one month and then evaluated for taste by a panel of 20 experts. Each panelist rated the chocolate based on the following criteria:

| Remarks | Score |
|---|---|
| Very Excellent | 9 to 10 |
| Excellent | 7 to 8 |
| The Same As Cacao Oil | 5 to 6 |
| Less Than Cacao Oil | 3 to 4 |
| Much Less Than Cacao Oil | 1 to 2 |

The average rating is reported in Table 3.

TABLE 3

| | Evaluation of Chocolates | | |
|---|---|---|---|
| | hardness (g) | anti-blooming effect | flavor |
| Example 1 | 880 | larger than 30 | 7.6 |
| Example 2 | 870 | larger than 30 | 7.8 |
| Comparative Example 1 | 1720 | 8 | 5.6 |
| Comparative Example 2 | 1250 | 13 | 6.8 |
| Comparative Example 3 | 1140 | 3 | 1.7 |

As Table 3 shows, chocolates comprising diglycerides having a melting point of 25° C. or below (Examples 1 and 2) were superior in softness to the conventional soft chocolate comprising a liquid oil (Comparative Example 3) and showed stable qualities without suffering from any oil-off or blooming. Further, the products according to the invention had a good cacao taste that was excellent in perristence.

Example 3

A palm mid fraction, having a melting point of 32.7° C. was used in making the chocolate of the following formulation.

| <Formulation> | |
|---|---|
| granulated sugar | 45 (parts) |
| whole fat milk powder | 15 |
| cacao mass | 25 |
| cacao fat | 5 |
| moderate m.p. fraction of palm oil | 5 |
| diglycerides (2) | 5 |
| lecithin | 0.3 |

The chocolate thus obtained was evaluated in the same manner as the one described in Examples 1 and 2. As a result, it sustained stable qualities and showed a soft texture and an excellent flavor of cacao after storing for a month.

Example 4

A common chocolate base of the following formulation A was kneaded together with a W/O emulsion of the following formulation B to prepare a chocolate containing an aqueous component.

| <Formulation A> | |
|---|---|
| granulated sugar | 45 (parts) |
| whole fat milk powder | 7 |
| cacao mass | 25 |
| lecithin | 0.3 |
| <Formulation B> | |
| condensed milk | 8 (parts) |
| cacao fat | 5 |
| diglyceride (2) | 10 |

The chocolate thus obtained had a soft texture and a good flavor of milk. When the diglyceride (2) was replaced by rapeseed oil, the obtained chocolate did not have the desired qualities. In contrast, the chocolate obtained in this Example had a uniform texture and a high resistance against blooming and remained stable in moisture content after the lapse of time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chocolate comprising (1) cacao mass, cacao powder, or mixtures thereof; (2) sweetener; and (3) fats; wherein said fats are comprised of (a) 50-98% by weight of cacao fat, a fat similar thereto, or mixtures thereof, and (b) 10-50% by weight of a diglyceride composition which consists of one or more diglycerides and has a melting point of 25° C. or less, based on the total weight of fats wherein said chocolate has a soft texture below room temperature and exhibits stable qualities above room temperature.

2. The chocolate according to claim 1, wherein said diglyceride has a melting point in the range of −20° to 15° C.

3. The chocolate according to claim 1, wherein said diglyceride composition contains a diglyceride that is formed from unsaturated fatty acids having 16 to 22 carbon atoms.

4. The chocolate according to claim 3, wherein at least 70% by weight of said diglyceride composition is formed from said unsaturated fatty acids.

5. The chocolate according to claim 4, wherein at least 80% by weight of said diglyceride composition is formed from said unsaturated fatty acids.

6. The chocolate according to claim 1, wherein said diglyceride composition contains at least 50% by weight of di-cis-unsaturated diglycerides.

7. The chocolate according to claim 6, wherein said diglyceride composition contains at least 70% by weight of di-cis-unsaturated diglycerides.

8. The chocolate according to claim 1, wherein said sweetener is selected from the group consisting of granulated sugar, sorbitol, and sucrose.

9. The chocolate according to claim 1, wherein said fats component further comprises milk fat.

10. The chocolate according to claim 1, wherein said fat similar thereto is selected from the group consisting of fractionated vegetable oils, fractionated transesterified fats, and saturated fats.

11. The chocolate according to claim 10, wherein said fat similar thereto is selected from the group consisting of fractionated palm oil, fractionated shea butter, illippe butter, fractionated transesterified palm oil, fractionated transesterified olive oil, fractionated transesterified safflower oil, and stearic acid.

* * * * *